Figure 3:
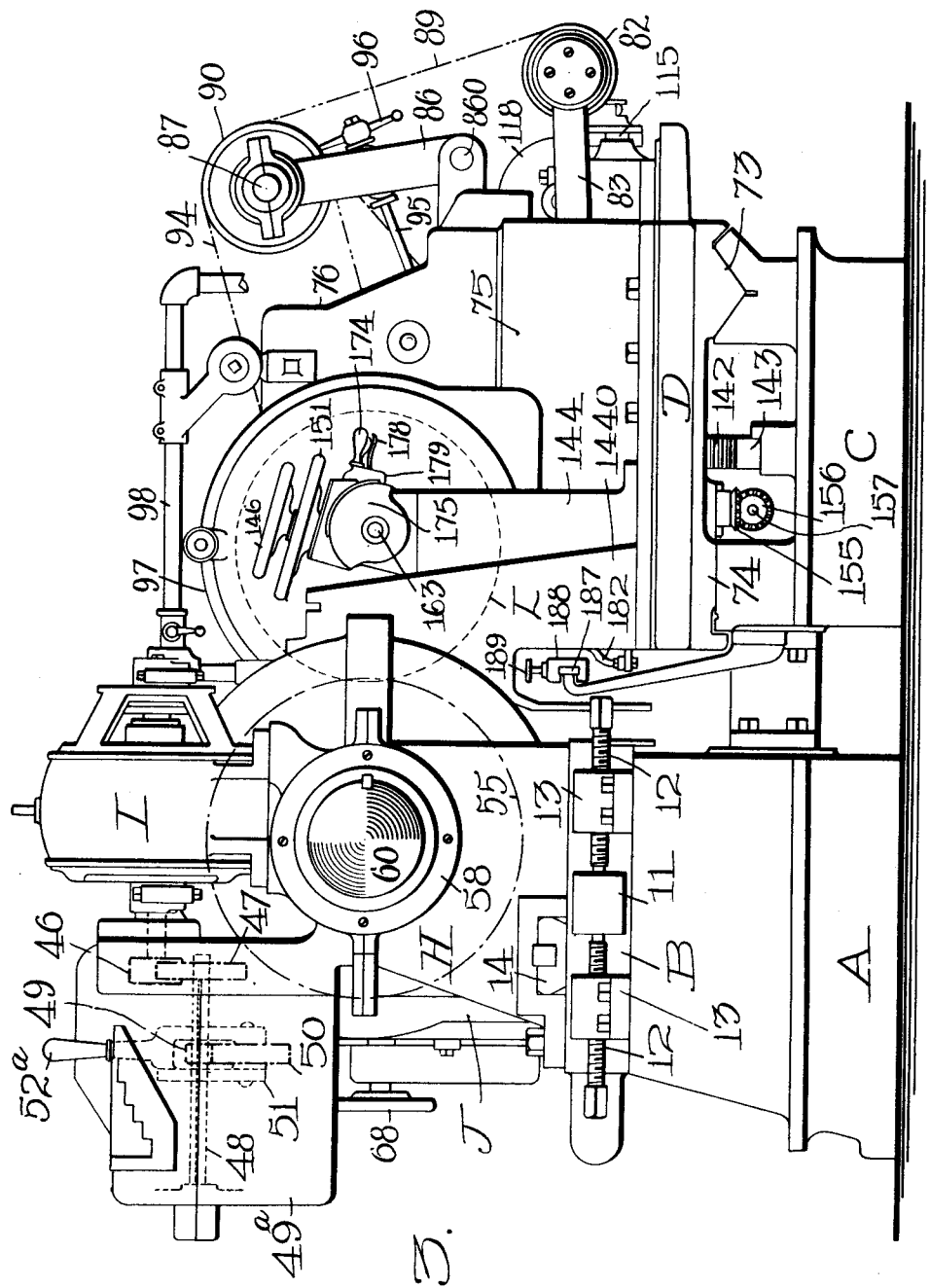

C. H. NORTON.
APPARATUS FOR GRINDING ROLLS.
APPLICATION FILED JUNE 14, 1911.
1,096,188.
Patented May 12, 1914.
13 SHEETS—SHEET 1.
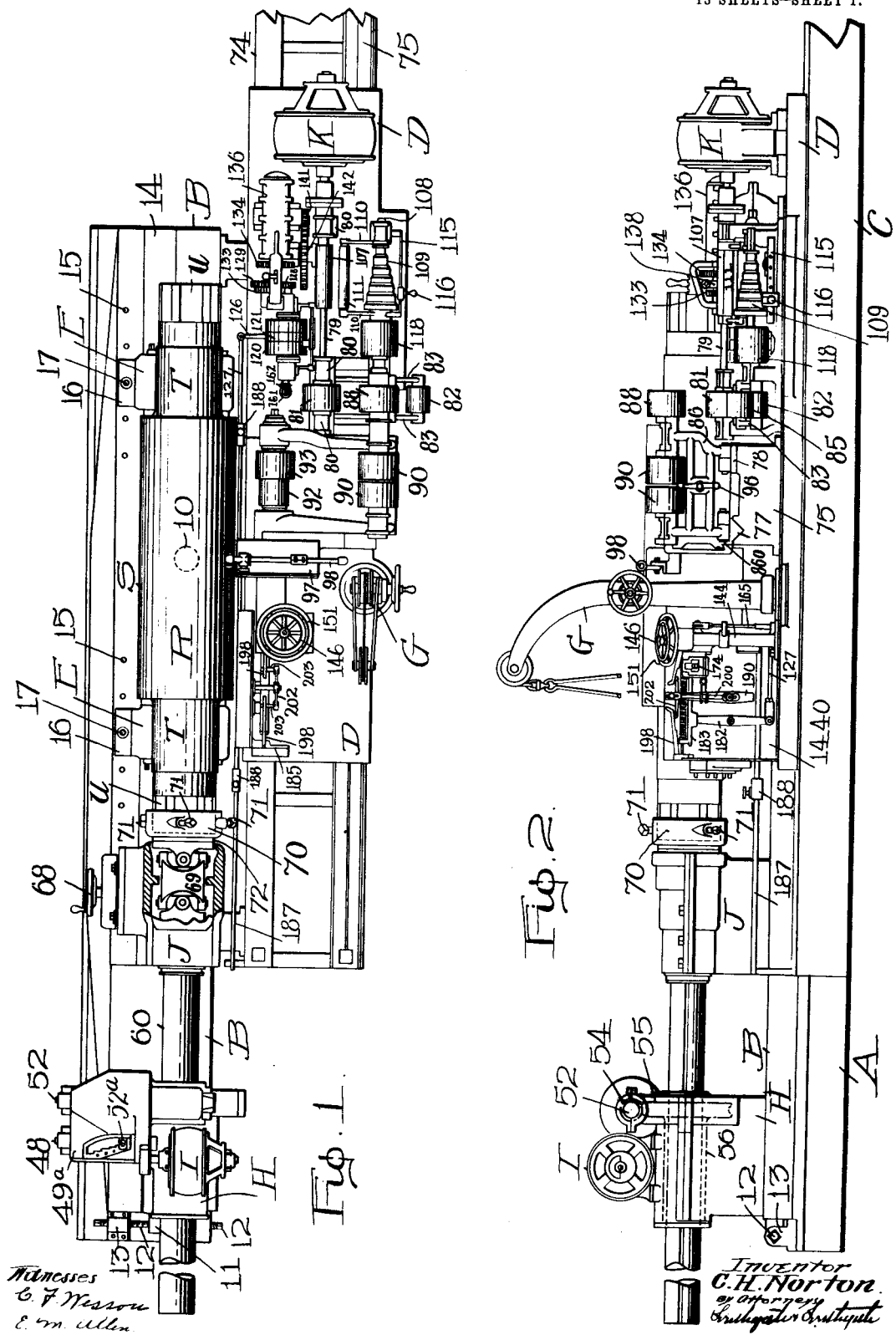

C. H. NORTON.
APPARATUS FOR GRINDING ROLLS.
APPLICATION FILED JUNE 14, 1911.

1,096,188.

Patented May 12, 1914.

13 SHEETS—SHEET 2.

Witnesses:
C. F. Wesson
E. M. Allen

Inventor:
C. H. Norton
By Attorneys
Southgate & Southgate

C. H. NORTON.
APPARATUS FOR GRINDING ROLLS.
APPLICATION FILED JUNE 14, 1911.

1,096,188.

Patented May 12, 1914.
13 SHEETS—SHEET 3.

Witnesses:
C. F. Wesson.
E. M. Allen.

Inventor:
C. H. Norton.
by Attorneys
Southgate & Southgate

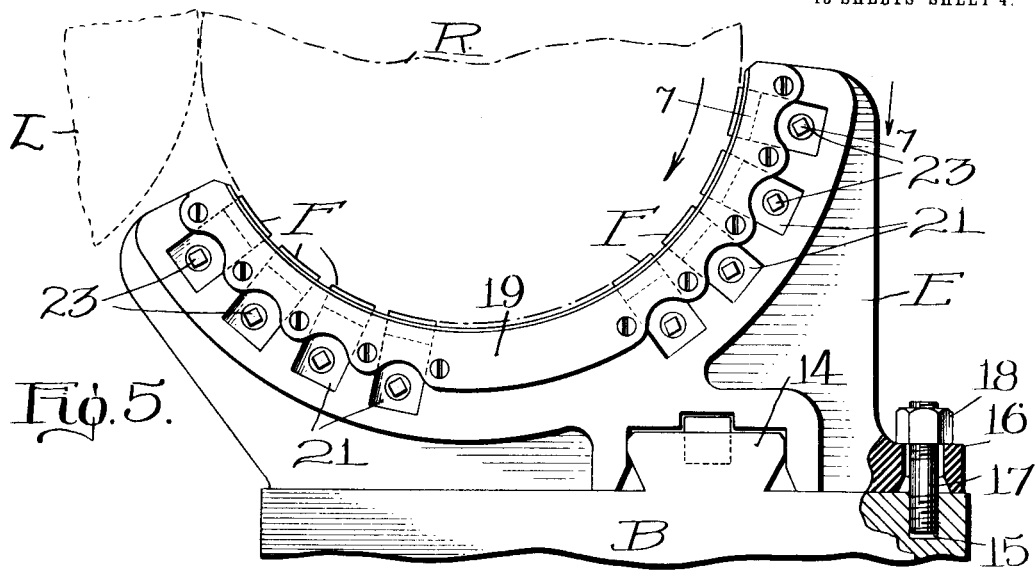
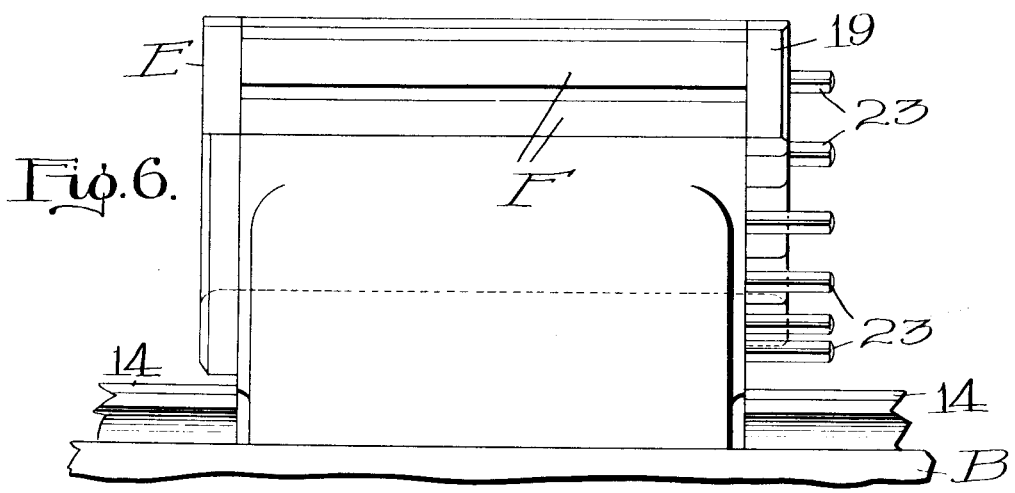
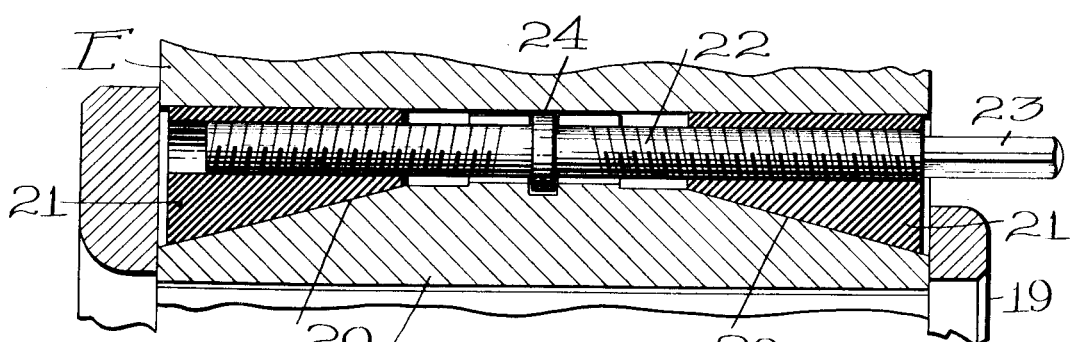

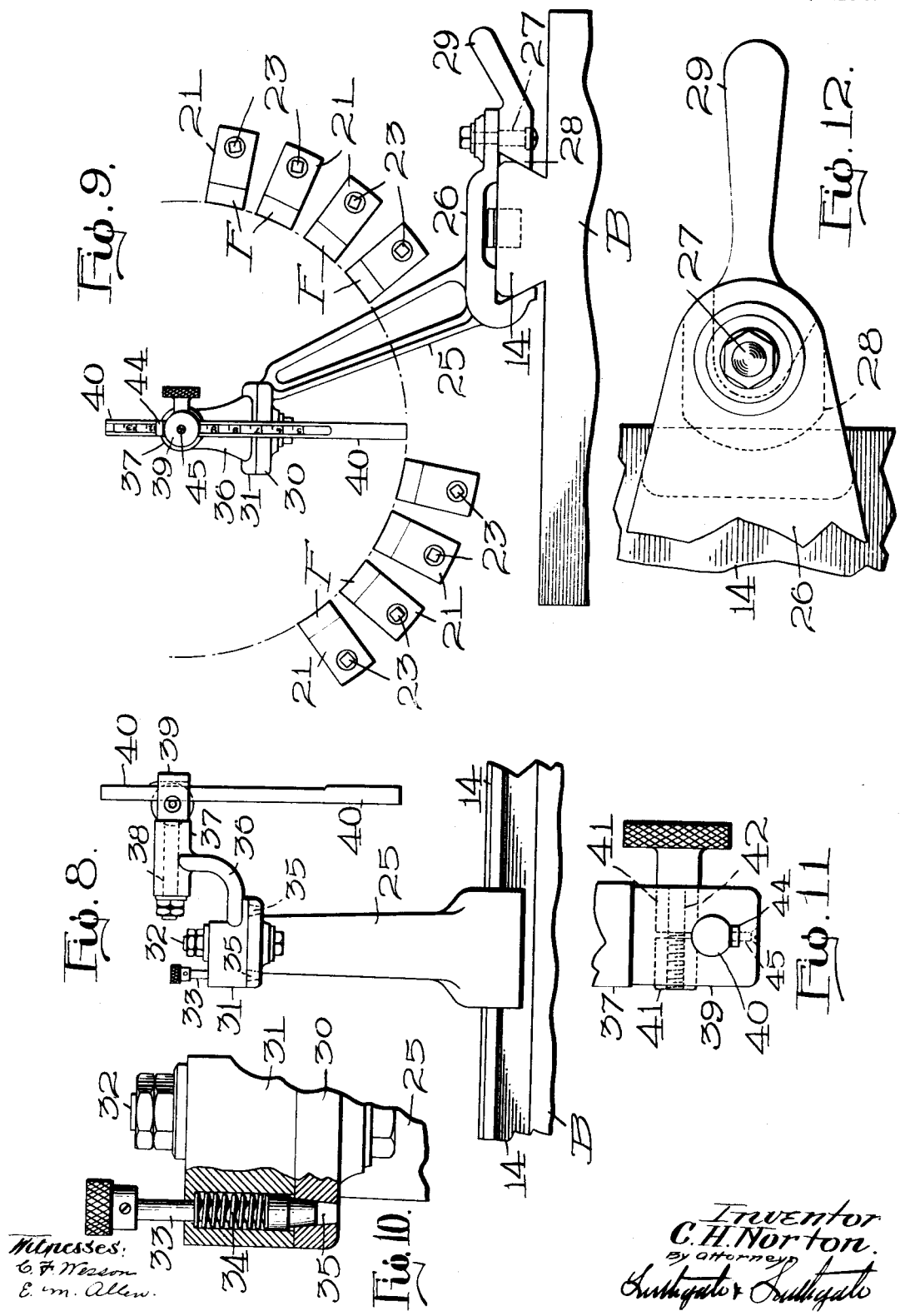

C. H. NORTON.
APPARATUS FOR GRINDING ROLLS.
APPLICATION FILED JUNE 14, 1911.

1,096,188.

Patented May 12, 1914.
13 SHEETS—SHEET 6.

C. H. NORTON.
APPARATUS FOR GRINDING ROLLS.
APPLICATION FILED JUNE 14, 1911.

1,096,188.

Patented May 12, 1914.
13 SHEETS—SHEET 7.

Witnesses:
C. F. Wesson
C. M. Allen

Inventor
C. H. Norton
By Attorneys

C. H. NORTON.
APPARATUS FOR GRINDING ROLLS.
APPLICATION FILED JUNE 14, 1911.
1,096,188.
Patented May 12, 1914.
13 SHEETS—SHEET 8.
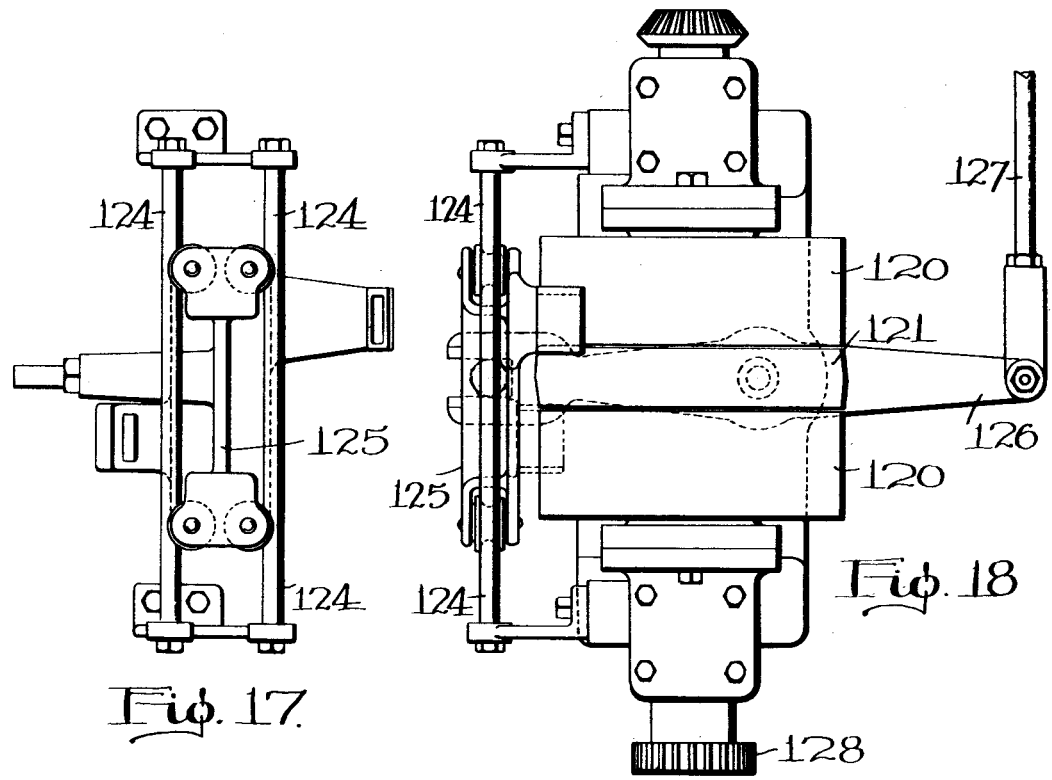
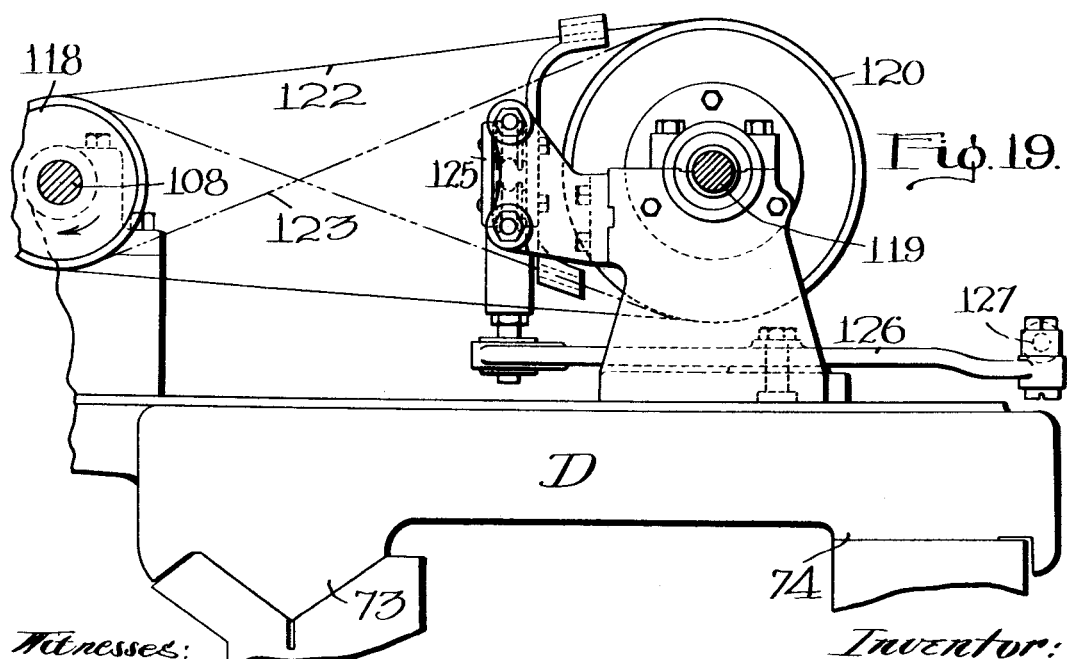
Witnesses:
C. F. Wesson
E. M. Allen
Inventor:
C. H. Norton
by Attorneys
Lithgate & Lithgate

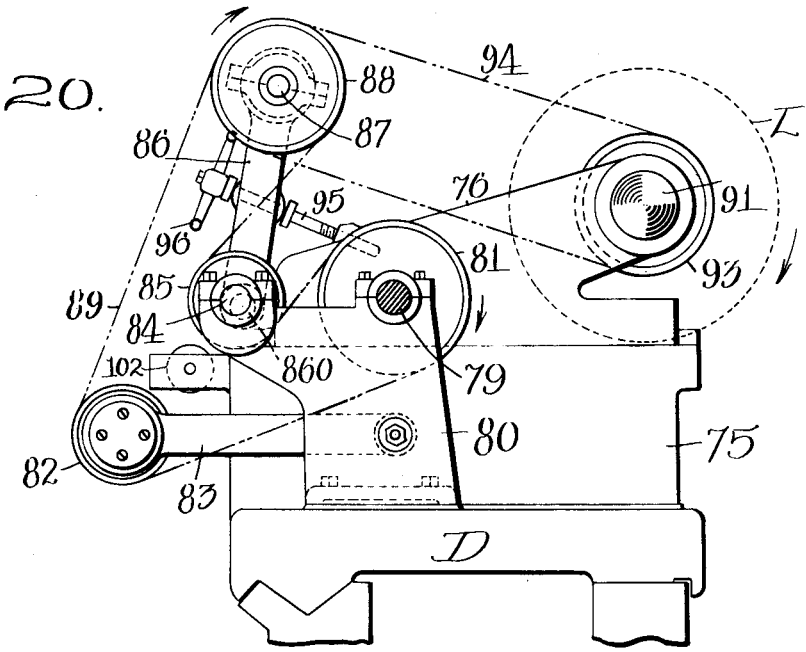
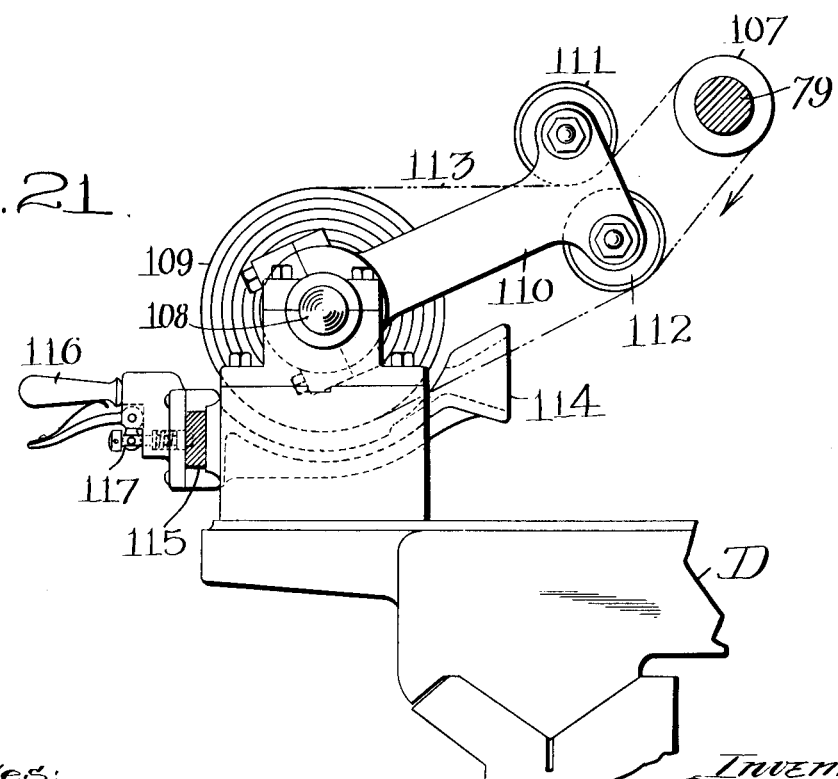

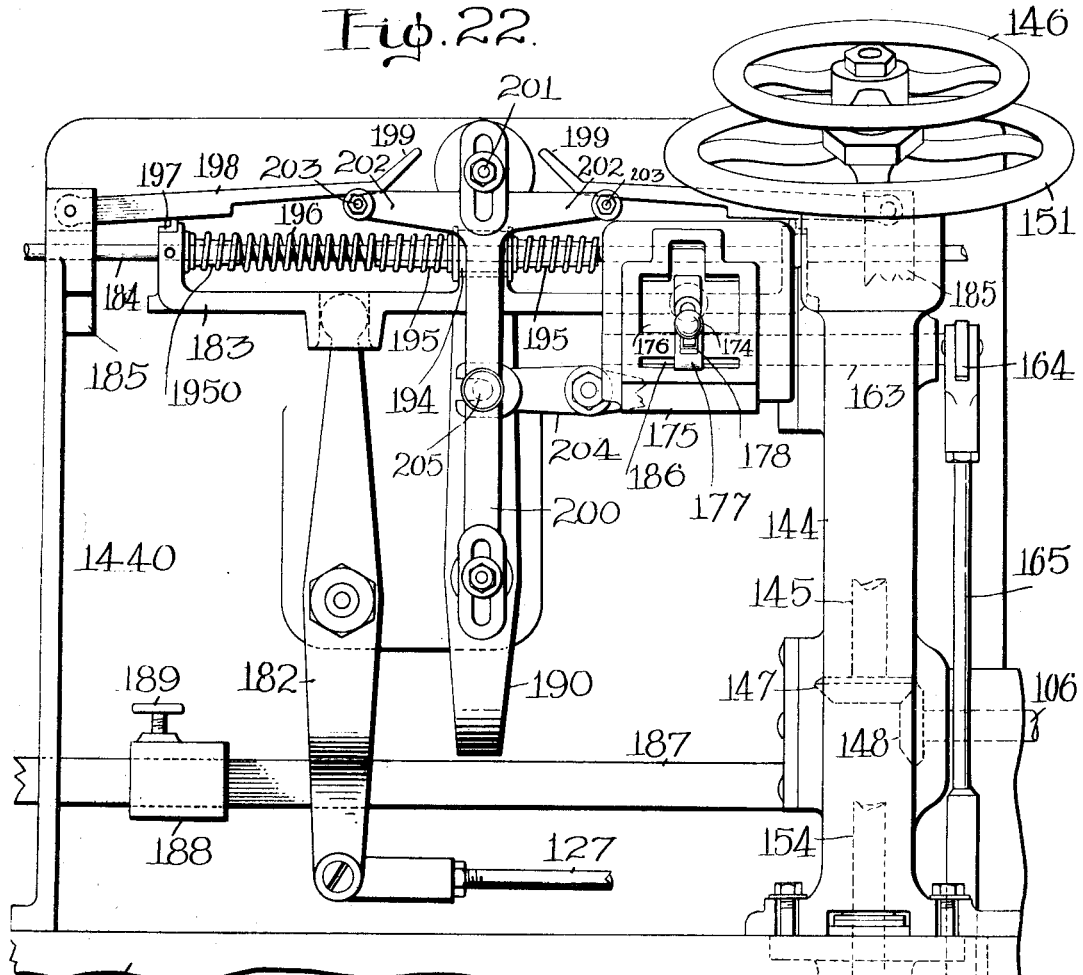

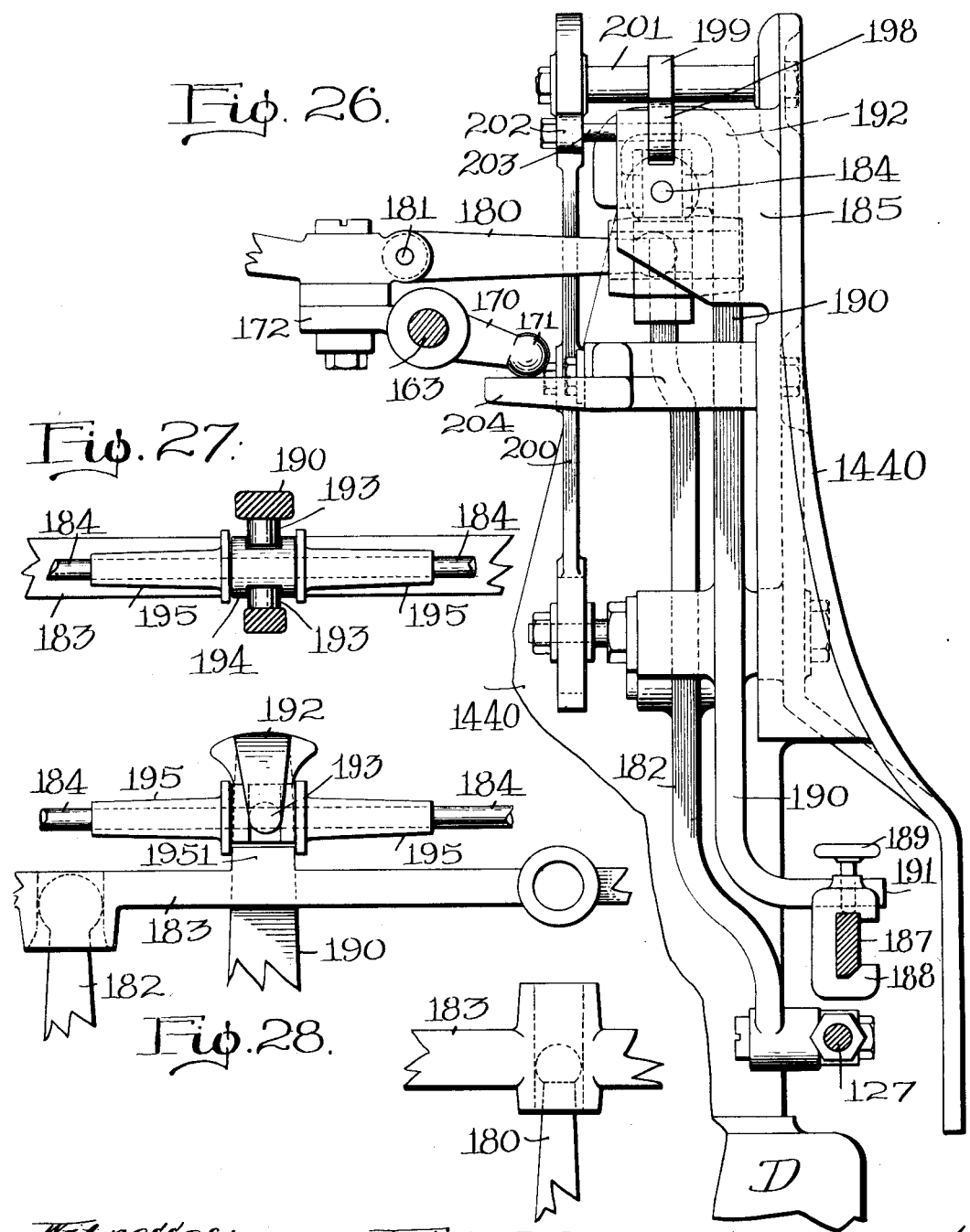

C. H. NORTON.
APPARATUS FOR GRINDING ROLLS.
APPLICATION FILED JUNE 14, 1911.

1,096,188.  Patented May 12, 1914.
13 SHEETS—SHEET 13.

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

APPARATUS FOR GRINDING ROLLS.

1,096,188. Specification of Letters Patent. Patented May 12, 1914.

Application filed June 14, 1911. Serial No. 633,021.

*To all whom it may concern:*

Be it known that I, CHARLES H. NORTON, a citizen of the United States, residing at Worcester, in the county of Worcester and State of Massachusetts, have invented a new and useful Apparatus for Grinding Rolls, of which the following is a specification.

This invention relates to an apparatus for grinding rolls, such as the rolls employed in rolling mills for rolling metal, the rolls employed in milling and crushing and grinding machinery, the rolls employed in printing and paper making machinery, etc. A roll of this character consists of a central cylindrical portion or working periphery and cylindrical bearings at the ends of the central portion. These rolls are also usually provided with irregularly shaped extensions beyond the bearings, on which extensions the driving gears or pinions are fitted. These rolls usually are originally turned and ground on centers and thus are approximately accurate when first made. But as rolls of this character are subjected to great pressure and strain when under duty, the working peripheries rapidly lose their exact shape and have to be re-ground and re-trued. This has to be done quite often because many of the rolls of this class have to be very exact, so as to work to the thousandth or to a fraction of a thousandth of an inch. After the rolls are originally made, the original centers on which the same are turned and ground are sometimes cut off or are destroyed or bruised. In fact it is difficult, even originally, to create centers of sufficient size and accuracy on which to revolve the roll. Therefore, a roll of this class usually cannot be re-ground or re-trued on its original centers.

The present practice in re-truing or re-grinding a roll of the character referred to is to support and rotate the same on its bearings and while the roll is turning on its bearings, to re-grind or re-true its working periphery. As the bearing surfaces wear irregularly and develop flat spots under the stress and friction of operation, it has been found that re-grinding the working periphery in this manner will not produce a perfect cylindrical or true surface. This particularly is the case, because the working periphery is usually larger in diameter than the diameter of the bearings, and hence any irregularity or flat spot in the bearings will be reproduced in larger character by re-grinding the working periphery while supporting the roll on its bearings in the condition they are brought to by use. I have discovered that this difficulty can be overcome by supporting the roll on its periphery, rotating the same while thus supported, and grinding the periphery of the roll while it is thus rotated and supported, or specifically in connection with a roll of the class described, by supporting the roll on the peripheries of its bearings and re-grinding both the bearings and working periphery while thus supported. The re-grinding or re-surfacing of the bearings of the roll can be very slight, just enough to bring the same to exact cylindrical surfaces. Then by re-grinding the working periphery of the roll while the same is supported and rotated on exact or true bearings, the working periphery can be brought to exact cylindrical shape.

With the above object in view, my invention contemplates the provision of a grinding machine in which the roll is supported by its bearings on arc-shaped supports in such a manner that said bearings may be ground while the roll is supported and rotated on said arc-shaped supports. In the actual operation of my machine the bearings are first calipered and then the supports are adjusted so that they will be arranged on an arc slightly smaller in diameter than the diameter of the bearings, in order that when the bearings are ground to perfect cylinders, their peripheries may not be smaller than the arcs of the supports. Then the roll is placed in position and rotated and the bearings ground to true cylindrical surfaces to fit and run truly on said supports, and then after the bearings are ground, the working periphery of the roll is ground. The roll is thus re-ground so as to have its original accuracy of cylindrical shape, both with respect to its bearings and also with respect to its working periphery and the roll is also re-ground so that its bearings and working periphery are developed in the same axial line. This result is of particular advantage in connection with rolls employed in rolling mills for rolling sheet metal, bars, rods and billets.

My invention consists of an improved apparatus by which the aforesaid result can be attained. This apparatus consists, in its general features, of a pair of heads containing arc-shaped supports which can be adapted in a manner previously described and which are adapted to receive and support a roll during its re-grinding, means for revolving said roll on said supports, and means for presenting a grinding wheel so as first to grind the bearings of the roll so that the same will coincide and run truly on said supports and then to grind and true the working periphery of the roll while the same is revolved on its re-surfaced bearings running on said supports. The apparatus is also made adjustable so that rolls of different dimensions and shapes may be ground in said apparatus.

The invention further consists of the improved combinations and arrangements of parts in such an apparatus which are described at length in this specification and pointed out in the claims.

The accompanying thirteen sheets of drawings illustrate the best form of apparatus now known to me for practising said invention.

Figure 4:
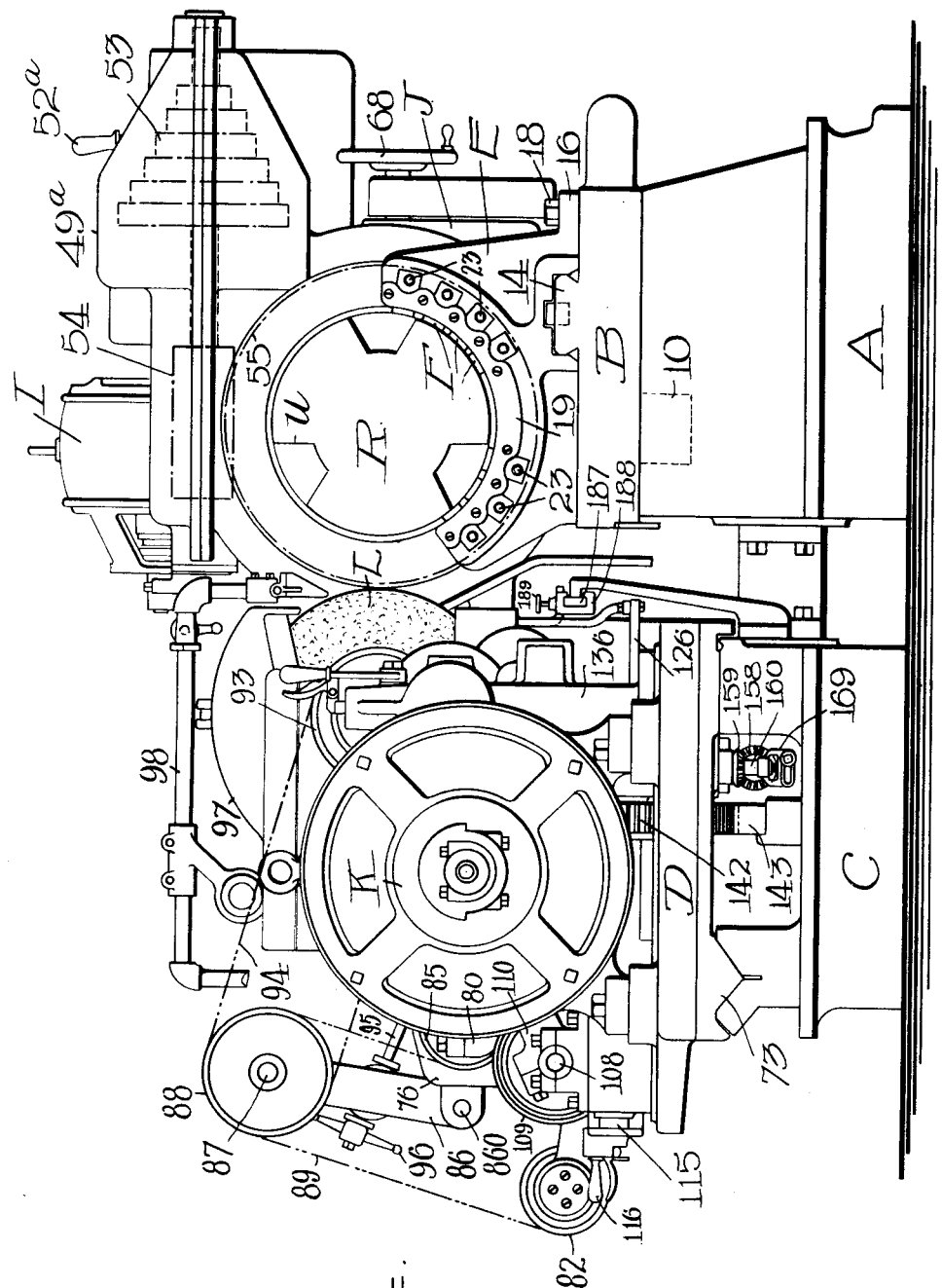
Figure 13:
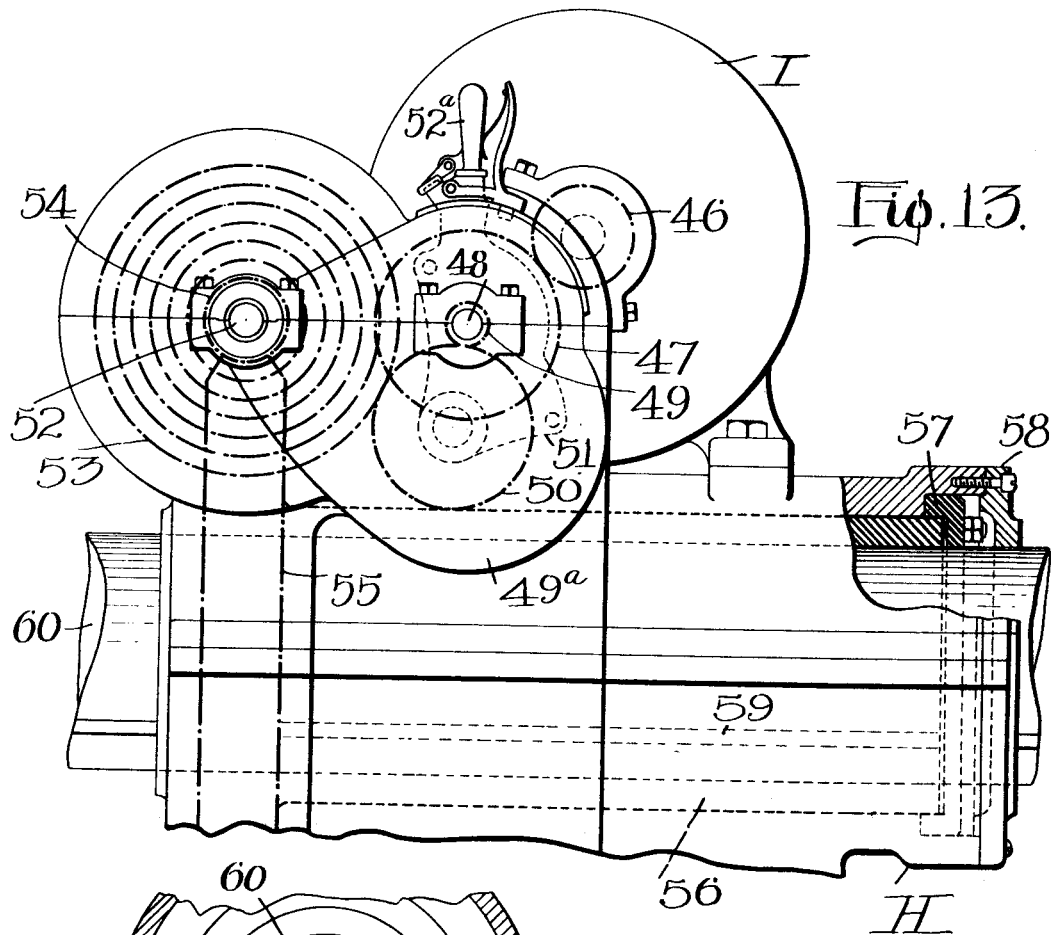
Figure 14:
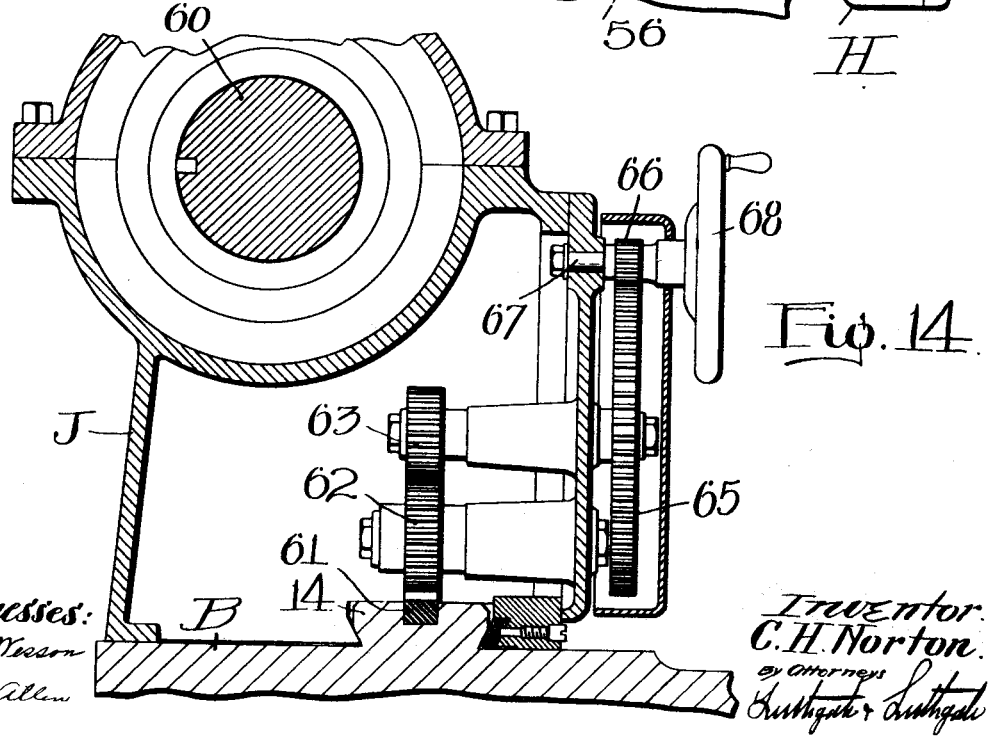
Figure 15:
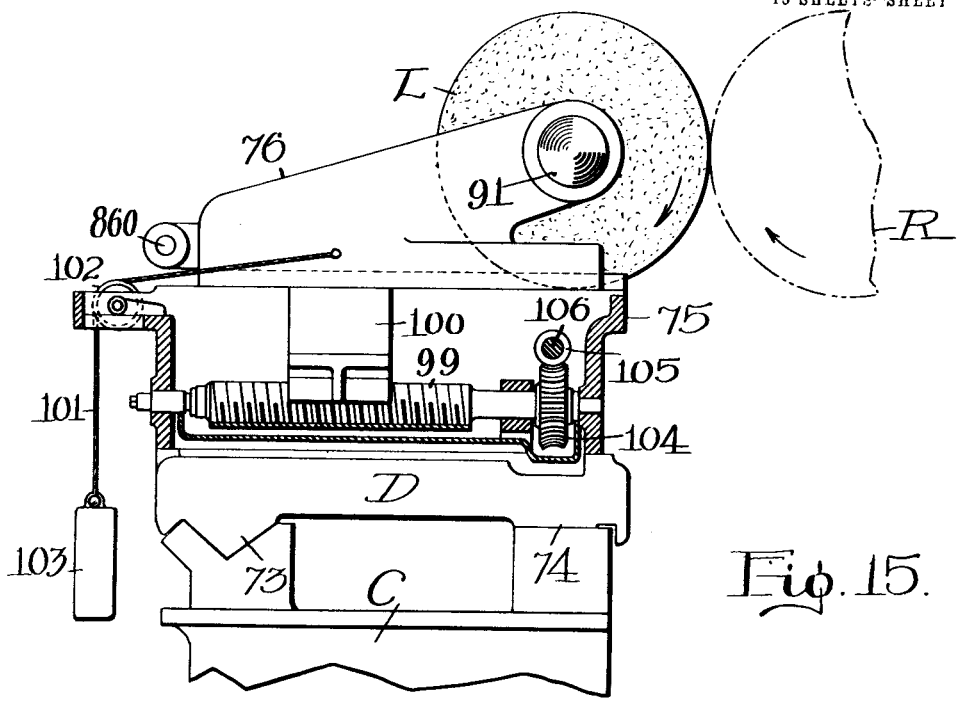
Figure 16:
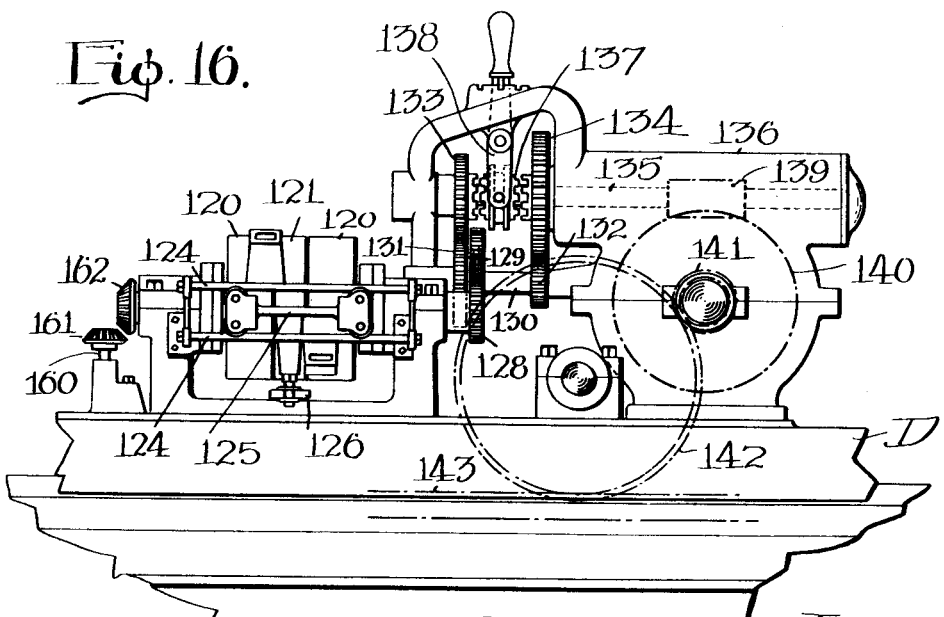
Figure 30:
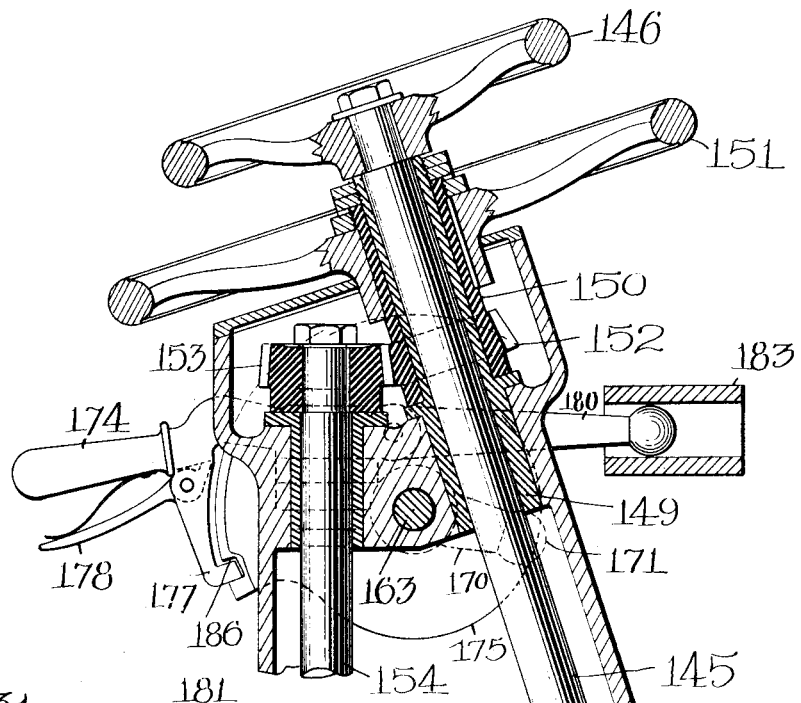
Figure 31:
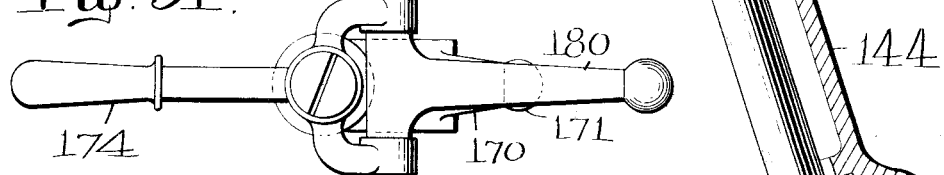
Figure 32:
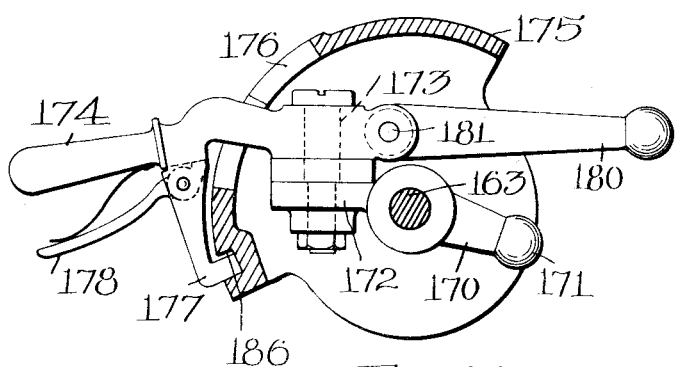
Figure 33:
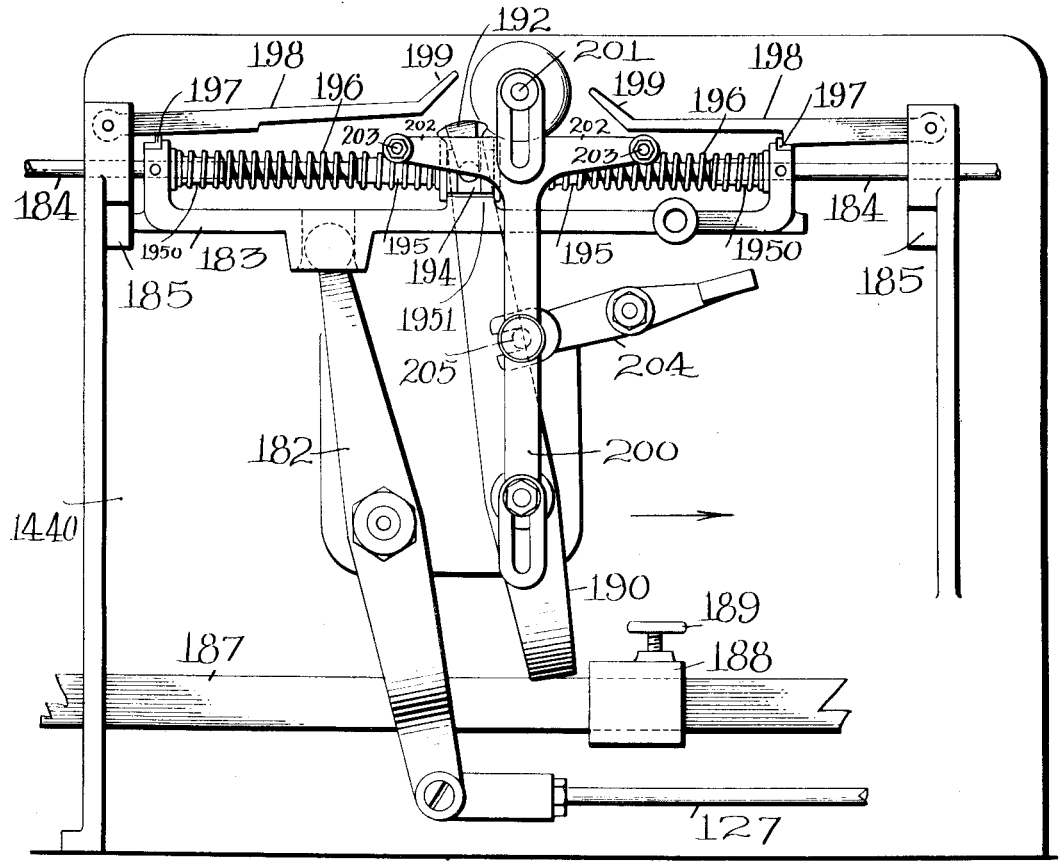
Figure 34:
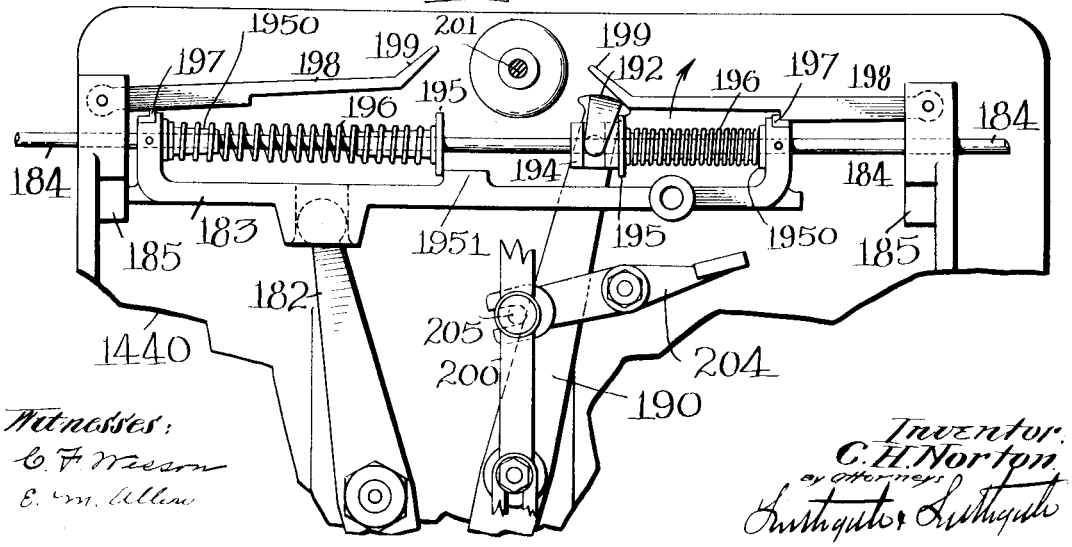

Referring to said drawings, Figure 1 is a plan view of the complete apparatus. Fig. 2 is a front elevation thereof. Fig. 3 is a left-hand end elevation thereof on an enlarged scale. Fig. 4 is a right-hand end elevation thereof on an enlarged scale. Figs. 5 and 6 are end and side elevations, respectively, of one of the supporting heads. Fig. 7 is a sectional plan on the line 7—7 in Fig. 5 showing the adjusting mechanism for one of the arc-shaped supports. Figs. 8 and 9 are side and end elevations of the calipering device which is employed to adjust the arc-shaped supports. Figs. 10, 11 and 12 are details of this calipering device on an enlarged scale. Fig. 13 is a side elevation of the driving head. Fig. 14 is a sectional elevation of the mechanism employed for moving the support for the driving shaft. Fig. 15 is a sectional elevation showing the mounting of the slide which carries the grinding wheel. Fig. 16 is a front elevation showing the gearing and belt driving mechanism for moving the wheel table forward and backward. Figs. 17, 18 and 19 are a front elevation, plan and end elevation of the belt shifting mechanism illustrated in Fig. 16. Fig. 20 is an end elevation showing the arrangement of belts for driving the grinding wheel. Fig. 21 is an end elevation showing the belt arrangement for giving different speeds to the grinding wheel. Fig. 22 is a front elevation of the operating handles and connections which are manipulated by the workman or operator. Figs. 23, 24 and 25 are details of the connections from the parts shown in Fig. 22. Fig. 26 is an end elevation of the parts shown in Fig. 22. Figs. 27, 28 and 29 are detail views illustrating the connections from the parts shown in Fig. 26. Fig. 30 is a sectional elevation through the operating connections shown in Fig. 22. Fig. 31 is a plan and Fig. 32 an end elevation of the handle which is connected to throw the wheel table into and out of operation, and Figs. 33 and 34 are detail views illustrating the action of the automatic reversing connections for the wheel table.

Referring to the drawings and in detail, A designates the work base which supports the work table B, and C designates the wheel base on which the wheel table D is fitted to slide. The work base A and wheel base C are tied or joined together so as to constitute a strong frame-work or supporting bed for the parts. The work table B is provided with a depending bearing 10 which is fitted in a hole or socket in the work base A, so that if desired, the work table can be adjusted on its bearing 10 (Fig. 4) as a pivot, which adjustment is made when it is desired to grind the working periphery of the roll on a taper.

The work table is provided at its left-hand end with a lug 11 which is engaged by adjusting screws 12—12 threaded into blocks 13—13 fastened on the end of the work base, as shown in Fig. 3. By this means the work table can be adjusted on the pivot 10 for the purpose stated. The work table is provided with an upwardly extending guide or dove-tail 14.

The supporting heads or open bearings which support and carry the roll by its bearings during the grinding operation are designated by the letters E—E. These heads are similar in construction, except that they are rights and lefts. The heads E—E are provided with slots which are fitted to the edges of the dove-tail 14 so that the heads can be adjusted longitudinally of the work table B. The work table is provided with a series of threaded holes 15, as illustrated in plan in Fig. 1, and in detail in Fig. 5. The supporting heads E—E are provided with rearwardly extending ears 16, and studs 17 are passed through holes formed in said ears and threaded into said holes 15 after the supporting heads are adjusted to desired position. Nuts 18 are threaded on the ends of the studs 17. By this arrangement, the supporting heads can be moved longitudinally and locked in the desired position on the work table, as many holes 15 being formed in the work table as it is desired to give adjustments to the supporting heads. Each supporting head E is provided with a plurality of arc-shaped supports F, as illustrated in the fourth sheet of the drawings.

In the particular machine shown, two sets of four each of arc-shaped supports F are employed on each supporting head E. The rear set of bearings is arranged higher than the front set so as to oppose the thrust of the grinding wheel, and the front set is arranged at a low position to allow the grinding wheel to engage the roll on its horizontal diameter, as shown in Fig. 5.

The supports F are fitted in radial grooves or slots formed in each supporting head, and a plate 19 is secured to the side of each supporting head to keep the supports in position. The inside face of each support F is formed on a double incline 20—20, as illustrated in Fig. 7; and fitted in said slots under the supports are adjusting wedge-blocks 21—21, the bottoms of which are cut on inclines to correspond to the inclines 20—20. A compound, or right and left-hand screw 22 is threaded into each pair of adjusting blocks 21—21, which screw has an extending squared head 23. Each screw 22 also has a central flange or collar 24 which fits into a slot formed in the support F. By this arrangement, by turning the screws by means of a suitable wrench, each support F can be adjusted radially on its supporting head and by reason of the inclines, these adjustments can be made very accurately.

R designates the roll which is to be ground. This roll, as illustrated, has a central or working periphery S, two bearings T—T, and extending irregularly shaped ends U—U for receiving the driving gears or pinions. When the roll R is to be placed in the machine, the bearings T—T thereof are calipered and the arc-shaped supports F—F are adjusted to a diameter slightly smaller, say two or three thousandths smaller, than the original diameter of the bearings. This adjustment of the supports is obtained by the caliper mechanism illustrated in the fifth sheet of the drawings. This caliper mechanism consists of a bracket 25 which has a foot 26 which fits upon the dove-tail 14 of the work table. A bolt or stud 27 is carried by said foot and pivoted on said stud is a cam 28 having a projecting handle 29 by which the bracket 25 can be locked tightly to the dove-tail 14, as shown in Fig. 12. The top of the bracket 25 is formed to constitute a support 30 and rotatably resting thereon is a hub 31 which is held to the support by a screw 32 which has nuts on its end, these parts being arranged so that the hub 31 can turn on said support.

A plunger 33 is housed in the hub 31 and is pressed downwardly by a spring 34. The end of the plunger 33 is shaped to engage holes 35—35 bored in the support 30, these holes being preferably formed on a taper to coincide with the taper on the end of the plunger, as shown in Fig. 10. By this construction, the hub 31 can be turned 180 degrees so that the calipering device can be used with either supporting head.

Extending from the hub 31 is an arm 36 which has a bearing 37 at its end. Journaled in said bearing is a shaft 38 which is held in said bearing by a suitable washer and nuts. The end of the shaft 38 is shaped to form a split yoke 39, fitting in which is a calipering rod 40. Engaging said calipering rod 40 are two blocks 41—41. The right-hand block is bored out and fitting through the same is a screw 42, which screw is threaded into the left-hand block. The screw 42 is provided with a milled head at its end. By this arrangement, the calipering rod 40 can be adjustably secured in the yoke 39. The front of the calipering rod 40 is slabbed off and if desired, a scale is marked thereon. A small block 44 is fitted in the yoke 39 to engage the slabbed face of the calipering rod 40, which block is held in position by a screw 45. The top of this block can be employed to read the scale formed on the calipering rod.

After the bearings T—T of the roll R have been calipered, the calipering rod 40 is set to the desired dimension and the supports F, F are adjusted to exact position, which is found by swinging the calipering rod on its shaft 38 so as just to engage the arc-shaped faces of the supports F—F. After the supports are adjusted in this manner the roll is lowered into position in the said supporting heads. The mechanism for rotating the roll while thus supported will now be described. On the end of the work table B is secured a driving head H, on the top of which is arranged a suitable electric motor I, to which current may be delivered through suitable line wires, switches and rheostat. On the shaft of this motor is arranged a pinion 46 which engages a gear 47 mounted on a shaft 48 journaled in a gear box 49ª secured to said driving head H. This shaft 48 has a key-way therein, and sliding axially thereon and keyed thereto is a pinion 49. This pinion 49 engages a gear 50 journaled on a stud secured in a yoke 51, which yoke is fitted to slide on said shaft 48 and which yoke has a projecting handle 52ª which is provided with a locking mechanism, as illustrated in Fig. 13 so that it can be secured to the casing in different positions. A shaft 52 is journaled in the frame secured to the driving head H and a cone of gears 53 is mounted thereon. The gear 50 can be meshed into any one of said cone of gears. Secured on said shaft 52 is a worm 54 which meshes and engages with a worm gear 55 formed with, or fastened on, a hub 56 journaled in a bearing formed in the driving head H, as illustrated in Fig. 13. A collar 57 is secured on the end of said hub to keep the same in place in the bearing, and another collar 58 is secured on the end of the bearing to protect the driving parts. The said hub 56 is provided with a key 59. Fitting in said hub is a driving shaft 60 which has a slot or key-way in which the key 59 engages. The end of said driving shaft is journaled in a support J fitted on the work table B and engaging the dove-tail 14 thereof. This support J can be moved forward and backward by means of the mechanism illustrated in Fig. 14. This mechanism consists of a rack 61 secured to the dove-tail 14, a gear 62 carried by said support J engaging said rack, a pinion 63 engaging said gear, which pinion 63 is mounted on a shaft journaled in a hub formed in a plate secured to said support and on the end of which shaft is arranged a gear 65, meshing with which is a pinion 66, secured on a shaft 67 journaled in said plate, which shaft carries a hand wheel 68. By manipulating this hand wheel 68 the said support J can be moved longitudinally on the work table B. The end of said driving shaft 60 is provided with a universal joint 69, illustrated in Fig. 1, the central part of which universal joint is supported by a rib formed in the support J. Attached to the outer end of the universal joint is a socket head 70, which is shaped to engage the end of the roll R and which is provided with suitable screws 71 by which the same can be tightly secured to the end of the roll R. When the roll R is to be placed in position in the supporting heads, the support J is first moved to the left so as to be clear of the roll, and after the roll is in position, the support J is moved toward the roll by turning the hand wheel 68, until the socket 70 fits over and engages the end of the roll and the socket is then clamped to the end of the roll by the screws 71. The socket 70 has a cylindrical portion 72 which fits somewhat loosely to the end of the support J so that the universal joint and socket will be supported when the support J is moved away from the roll. By these arrangements, the roll R will be supported on the adjusted arc-shaped supports in the supporting heads on the work table and will be revolved on said supports, and by the change gearing described can be revolved at different speeds. When the roll is put in the supporting heads and the bearings thereof ground true, as previously described, the universal joint 69 forms a flexible connection in the driving means for rotating the roll and will allow the same to come to exact center in the arc-shaped supports without any drag or distortion from the driving means.

The wheel table D is provided with a V 73 and a flat bearing 74 which fit on guide ways formed on the wheel base C, as illustrated in Fig. 15. A supporting base 75 is secured on the wheel table D and fitted to slide on the same transversely of the machine is a wheel support 76 which has a V 77 and a flat bearing 78 engaging with ways formed on said supporting base 75, as illustrated in Fig. 2.

An electric motor K is secured on the wheel table D and is employed to rotate the grinding wheel and to reciprocate the wheel table D on the wheel base C, to which motor current may be delivered through suitable line wires, switch and rheostat. The arrangement by which the grinding wheel L is driven from said electric motor is as follows:—A shaft 79 is journaled in bearings 80 formed on the wheel table D so as to come in line with the shaft of the electric motor K, and said shaft 79 is coupled to the shaft of the electric motor K. On the end of this shaft is secured a pulley 81, as shown in Figs. 1 and 2 and in Fig. 20. An idler pulley 82 is journaled in arms 83 pivoted to the left-hand bearings 80 of the shaft 79. A shaft 84 is journaled in bearings formed in the support 80 and running on said shaft is another idler 85. Mounted on pivots 860 carried by the wheel support 76 is a yoke 86 journaled in the upper ends of which is a shaft 87 which carries a pulley 88. Running around the pulleys 81, 82, 88 and 85 is a belt 89 whereby the shaft 87 will be driven. Secured on the shaft 87 is a double-faced pulley 90—90, and secured on the shaft 91 which carries the grinding wheel L are two pulleys 92 and 93. A belt 94 is arranged between the double pulley 90—90 and the pulleys 92 and 93 to drive the grinding wheel. The tension of the belt 94 can be adjusted by a rod 95 which has collars engaging the yoke 86, which rod is provided with a suitable hand wheel 96 and the end of which is threaded into the base 76. By this arrangement, two speeds can be obtained by shifting the belt 94 on to either pulley 92 or 93 and by adjusting the tension of the belt. This arrangement also allows the wheel base 76 to be moved transversely on the supporting base 75, as the idler 82 will move up and down to keep the belt 89 under proper tension because its supporting arms 83—83 are pivotally supported. By this arrangement, the grinding wheel L can be rotated at two different speeds and the provision is made for the transverse adjustment thereof. The grinding wheel L is secured on the end of said shaft 91, which shaft 91 is journaled in bearings formed in the wheel support 76. If desired, the grinding wheel may be covered by a suitable casing 97, as illustrated in Fig. 1, and may be supplied with water through a suitable system of pipes 98. A crane G may be mounted on the wheel table so that the grinding wheel may be easily changed. The wheel support 76 (Fig. 15) is moved transversely by means of a screw 99 journaled in the supporting base 75 engaging which is a half nut 100 connected to the wheel support 76. The wheel support 76 is kept in its rearmost position afforded by the lost motion between said screw 99 and half-nut 100, by a cord or rope 101 trained over an idler pulley 102 journaled in the supporting base 75 and connected to a counter-weight 103. Mounted on the screw 99 is a worm wheel 104, engaging which is a worm 105 mounted on a shaft 106, which is journaled in bearings in the supporting base 75 and which shaft 106 is operated, as hereinafter described.

The mechanism for moving the wheel table D on the wheel base C is arranged as follows:—Mounted on the shaft 79 is a small pulley 107 of considerable length. A shaft 108 (Fig. 21) is journaled in bearings extending upwardly from the wheel table D. Mounted on this shaft is a series of pulleys or a cone pulley 109. Hung on bearings on the shaft 108 are arms 110 which carries idler pulleys 111 and 112. A belt 113 is trained around said pulleys 107 and 109 and the idlers 111 and 112. The belt 113 may be shifted to different steps of the cone pulley 109 by means of a belt shifter 114 which has a mouth engaging said belt 113 and which is fitted to slide longitudinally on a bar 115 secured to the front of the bearings of the shaft 108. The belt shifter is provided with a handle 116 which has a spring-pressed locking lever controlling a pin 117 which may be snapped into holes cut in the bar 115 to position the belt shifter 114 properly to cause the belt 113 to run on any desired step of the cone pulley 109, as illustrated in detail in Fig. 21. Also secured on the shaft 108 is a wide-faced pulley 118 (Figs. 1 and 19). Journaled in bearings, extending up from the wheel table D, is a shaft 119 which has two loose pulleys 120 (Figs. 17 and 18) and an intermediate tight pulley 121 mounted thereon. Open and cross belts 122 and 123 are arranged between the pulleys 118 and 120 and 121. Mounted in brackets extending from the bearings of the shaft 119 are rods 124 fitted to slide on which, by means of anti-friction rollers, is a belt shifter 125 which has extending forks engaging the open and cross belts 122 and 123, as shown in the eighth sheet of the drawings. A lever 126 is pivoted to the support for the shaft 119 and engages a pin extending downwardly from the belt shifter 125. A belt shifter rod 127 is connected to the end of the lever 126 and is operated as hereinafter described.

On the right-hand end of the shaft 119 is arranged a gear 128 which engages a gear 129 (Fig. 16) mounted on a shaft 130, which shaft carries gears 131 and 132 of different sizes, which mesh with gears 133—134 loosely mounted on a shaft 135 journaled in the casing 136 and in a bracket projecting therefrom. The said gears 133 and 134 are provided with clutch teeth on their opposed faces and keyed on the shaft 135 is a double-faced clutch 137, which has a groove engaged by pins extending from an operating yoke 138 journaled on said extending bracket and provided with a handle and locking pin to engage three notches on the top of said extending bracket. The gears 133 and 134 are also of different relative sizes. By this arrangement, two changes of speed can be obtained between the shaft 119 and the shaft 135. Mounted on the shaft 135 is a worm 139, which engages with a worm wheel 140, secured on a shaft journaled in said casing 136, which shaft carries a pinion 141, which meshes with a gear 142 mounted on a shaft journaled on the wheel base D, which gear also engages a rack 143 secured to the wheel base C. By this arrangement, the wheel table D can be moved by power longitudinally on the wheel base C, and by adjusting the belt 113 and the clutch 137, any one of fourteen different feeds can be given to the wheel table.

The operator stands at the left of the driving wheel, as shown in Figs. 1 and 2, and connections are provided so that he can control the feed movements of the wheel table D, and so that he can adjust the wheel transversely. These operating connections are shown more particularly in sheets 10 to 13, inclusive, of the drawings.

A bracket or support 144 is secured to the wheel table D. Journaled in this support is a shaft 145 (Fig. 30) which has an operating hand wheel 146 at its upper end and a miter gear 147 at its lower end, which engages with a miter gear 148 secured on the shaft 106 (Fig. 15) previously referred to. By this arrangement, the operator can adjust the wheel support transversely of the machine.

The upper end of the shaft 145 is journaled on a bushing 149, on which bushing is journaled a head 150 which is provided with a hand wheel 151 of larger diameter than the hand wheel 146 and which hand wheel 151 is arranged below the hand wheel 146. Mounted on the head 150 is a bevel gear 152 which meshes with a bevel gear 153, mounted on the end of a vertical shaft 154, journaled in suitable bearings projecting from said support 144. Said shaft 154 is provided at its lower end with a miter gear 155 (Fig. 22), which engages with a miter gear 156 secured on the end of a shaft 157 which is journaled to extend longitudinally in the wheel table D. Said shaft 157 is provided at its other end with a miter gear 158; which engages with a miter gear 159, provided with a key engaging a key-way formed in a vertical shaft 160, as shown more particularly in Fig. 23. This vertical shaft 160 is provided at its upper end with a bevel pinion 161 which can be engaged with a bevel gear 162 arranged on the end of the shaft 119. When the bevel pinion 161 is engaged with the bevel gear 162, the operator can move the wheel table D longitudinally of the machine by turning on the hand wheel 151. The engagement of these gears can only take place when the open and cross belts 122 and 123 are on the loose pulleys 120—120, or in other words, when the power feed is not in operation by means of the connections now to be described.

A shaft 163 is journaled in the brackets formed on the support 144, and secured to the end of the same is a lever 164, engaging which is a link 165, which has a rack 166 formed or attached to its lower end, as shown in Fig. 25. This rack engages a pinion 167 secured on the end of a shaft 168 journaled in the wheel table D. The end of this shaft is provided with an eccentric or cam, as shown in Figs. 23 and 24, which engages a small slotted yoke 169, which supports the vertical shaft 160, and by this means the engagement and disengagement of the beveled pinion 161 and 162 is controlled. Secured on the shaft 163 is a lever 170 which has a ball 171 at one end and its other end is provided with a support 172. Pivoted on this support by means of a screw stud 173 secured in said support, is an operating handle 174 (Sheet 12) which extends outwardly through a casing 175 secured to the brackets. This casing 175 is provided with a slot 176 (Fig. 22) shaped like an inverted letter T. The handle 174 is provided with a dog 177 which is controlled by a spring-pressed grip 178.

The operating handle has upper, intermediate and lower operative positions in which positions it controls respectively the hand feed, the manually controlled power feed, and the automatically controlled power feed. The parts are arranged so that when the operating handle 174 is lifted into the upper vertical portion of the slot 176, the bevel pinion 161 will be engaged with the bevel gear 162, whereby the work table can be moved by hand through the hand wheel 151. The handle may be held in this position by causing the dog 177 to engage the lower edge of the slot 176. When the handle 174 is in any other position except last described, the bevel pinion 161 is disengaged from the bevel gear 162. The operating handle 174 is provided with lugs fitted between which is an extending lever 180 which has a ball at its end and which lever is pivoted between said lugs by a pin 181. The belt shifter rod 127 (Fig. 18), previously referred to, is connected at its left-hand end to the lower end of a controlling lever 182 (Fig. 26) which is pivoted to an apron 1440 and the upper end of which is ball-shaped and engages in a slot cut in a slider 183 which is secured to a rod 184, which rod is fitted to slide in brackets or hubs 185—185 formed on the apron 1440. The ball on the lever 180 is also fitted in a slot formed in the slider 183, as shown in Figs. 29 and 30. As the extending lever 180 is pivoted by the pin 181 to the operating handle 174, only horizontal movements of the operating handle 174 will be transmitted through the lever 180 to the slider 183. Vertical movements of the operating handle will not cause the extending lever 180 to actuate the slider 183 because on such movements, the operating handle 174 and extending lever 180 will simply assume different positions relatively to each other, or turn on the pin 181. Thus by swinging the operating handle in the horizontal part of the slot 176, the slider 183 can be moved longitudinally of the machine and by this arrangement, the belt shifter 127 can be operated and the mechanism which feeds the wheel table D longitudinally put into operation. The parts are so arranged that when the handle 174 is swung to the left, the feed of the wheel table will take place to the left, and so that when the operating handle is swung to the right, the feed of the wheel table will take place to the right. It also will be seen that when the power feed is thrown on in this manner, the bevel pinion 161 is disengaged from the bevel gear 162. When the power is thus thrown off and on by manipulating the handle 174, the dog 177 is adjusted to fit in a slot 186, as shown in Figs. 22 and 32, this constituting the intermediate position of the handle.

In addition to the above mechanism, an automatic reversing mechanism is provided so that the wheel table D can be fed longitudinally forward and backward of the machine, and so that its motion will be automatically reversed. For this purpose, the following mechanism is provided.

A bar 187 is secured by suitable brackets to the front of the wheel base D (Figs. 22 and 26), and adjustably mounted on this bar are reversing stops 188 which can be set in any desired position by screws 189. A reversing lever 190 is pivoted to the apron 1440 and has an inwardly extending end 191 arranged as shown in Fig. 26, so as to be in position to engage with the stops 188—188. The upper end of this lever 190 is shaped like an arch, as at 192, and is provided with lugs 193—193 which engage with a sleeve 194 mounted on the rod 184 which carries the slider 183, as shown in Figs. 27 and 28. Arranged between collars 195 fitted on said rod 184 are springs 196—196, a stop 1951 being provided on the slider 183 in position to engage the collars 195—195, to limit the expansion of the springs 196—196. The slider is provided at its ends with catches 197—197 (Fig. 22), and latches 198—198 are pivoted to the apron 1440 to coöperate with said catches. The ends of said latches are turned up or formed in cam shape as at 199 and arranged in position to be operated by the end 192 of the lever 190. A floating lever 200 is provided with a slot which is fitted on an extending portion of the pivot of the lever 190 and also on a column or support 201 extending out from the apron 1440. This lever 200 is provided with outwardly extending arms 202—202 which are provided with studs 203—203 which engage under the projecting ends of the latches 198—198. A lever 204 is pivoted to the apron 1440 and provided with a forked end which engages with a pin or roll 205 attached to the floating lever 200. The other end of the lever 204 is arranged in position to be engaged by the ball 171 on the lever 170 (Fig. 26).

When the handle 174 is in the narrow vertical part of the slot 176, or when the dog 177 is in the slot 186, the lever 170 engages with the end of the lever 204 and holds up the floating lever and thus keeps the latches 198—198 in raised position so that they will not coöperate with the catches 197—197. When it is desired to allow the reversing mechanism to work, the dog 177 is disengaged from the slot 186 and then the operating handle 174 is lowered to extreme lower position and is moved sidewise in the direction it is desired to cause the wheel table to travel. Suppose, for illustration, the operating handle 174 is rocked to the right. This will cause the work table to move to the right. This movement of the operating handle 174 will move the slider 183 to the left and will allow the right-hand latch 198 to engage its catch 199, as shown in Fig. 33. Now the work table D will move to the right until the lower end 191 of the lever 190 engages the right-hand reversing stop 188. As this action takes place, the upper end of the lever 190 will be swung to the right, which will put the right-hand spring 196 under heavy tension and as this swinging of the upper end of the lever 190 continues, the upper end 192 thereof will finally engage the cam-shaped end 199 of the right-hand latch 198 and will lift the same free of its catch 197. The tension of the right-hand spring 196 will now throw the slider 183 to the right, which will cause the left-hand catch 197 to engage under the left-hand latch 198. This movement of the slider 183 to the right will rock the upper end of the shifting lever 182 to the right which will throw the belt shifter rod 127 and the belt shifter, previously described, to reverse the motion of the wheel table. Thus the motion will be automatically reversed at the position determined by the right-hand reversing stop 188. The wheel table will now move to the left and when the lower end of the lever 190 engages the left-hand reversing stop 188, the motion of the wheel table D will be reversed automatically at its left-hand extreme of travel.

Thus, by the mechanism described, the operator standing on the wheel table can adjust the grinding wheel transversely with regard to the work, can move the wheel table by hand, can cause the same to move by power in either direction, or can throw in mechanism which will cause the wheel table to travel forward and backward automatically within the limits determined by the adjustment of the two reversing stops. It also will be seen that by the connections described, it is possible for the operator to control the feed movement entirely by hand, irrespective of the automatic reversing mechanism. It also will be seen that when the power feed is thrown on by shifting the handle 174 with the dog 177 in the slot 186, if the lever 190 should engage one of the reversing stops 188, such engagement will surely move the handle 174 and the levers 190 and 182 back to upright or vertical positions, and thus will stop the feed in the particular direction without causing a reversal thereof. This action will take place because the handle 174 is in intermediate position and the floating lever 200 will be raised in position to hold the latches 198—198 above the catches 197—197. When the automatic feed is in use, the operator can stop the feed at any time by raising the handle 174 until the dog 177 engages the slot 186, and then moving the handle 174 to its central position. Thus, the operator standing on the work table has complete control of the operation of the grinding wheel under his charge. Thus by the apparatus described, many different forms and shapes of rolls can be trued or re-ground.

The details and arrangements of apparatus herein shown and described as the best form now known to me for practising my invention, can be greatly varied by a skilled mechanic without departing from the scope of the invention as expressed by the claims.

I make no claim in this application for my improved method of grinding rolls, nor to the construction of my improved open bearing, nor to the construction of the calipering device herein shown, these inventions forming the subject matter of divisional applications Nos. 790,804 and 790,805, filed by me on September 19, 1913.

Having thus fully described by invention, what I claim and desire to secure by Letters-Patent is:—

1. In a grinding machine, the combination of a wheel table, means for moving said table by hand, means for moving the same by power, automatic controlling mechanism for said power feed and manual controlling means for said power feed, said latter means comprising a single hand lever movable in one direction to determine which feeding means shall be operated, and movable in a second direction to determine the direction in which said power feed shall move the table.

2. In a grinding machine, the combination of a wheel table, means for moving said table by hand, means for moving the same by power, automatic controlling mechanism for said power feed and a single device for rendering said automatic controlling means inoperative and for thereafter manually controlling said power feed.

3. In a grinding machine, the combination of a wheel table, means for moving said table by hand, means for moving the same by power, automatic controlling mechanism for said power feed and a single device for rendering said power feed inoperative and for simultaneously rendering said hand feed operative.

4. In a grinding machine, the combination of a wheel table, hand feeding means therefor, automatically controlled power feeding means therefor, manually controlled power feeding means therefor, and means so constructed and connected that when one of said feeding means is rendered operative, the other two feeding means will be rendered inoperative.

5. In a grinding machine, the combination of a wheel table, hand feeding means therefor, automatically controlled power feeding means therefor, manually controlled power feeding means therefor, and a single controlling handle by which any one of the feeding means may be rendered operative and the other two feeding means will be simultaneously rendered inoperative.

6. In a grinding machine, the combination of a pair of open bearings for supporting a roll on its bearing members, and means for grinding said roll, said open bearings being so constructed that the grinding means may contact and operate upon the bearing members supported therein along a line substantially in the horizontal plan of the axis of the roll.

7. In a grinding machine the combination of a pair of open bearings for supporting the roll on its bearing members, and means for grinding said roll, said open bearings being depressed at their front portion to permit the grinding means to operate upon the roll bearing supported substantially in the horizontal plane of the axis of the roll, and being elevated at the rear portion to support the roll bearing against the thrust of the grinding means.

8. In a grinding machine, the combination of a pair of open bearings for supporting a roll on its bearing members, and means for grinding said roll, each open bearing comprising front and rear sets of arc-shaped supports, the uppermost support of the front set being located a substantial distance below the horizontal plane of the axis of the roll supported thereon so that the grinding means may contact with and grind the bearing of the roll substantially in the horizontal plane of the axis.

9. In a grinding machine, the combination of a pair of open bearings for supporting a roll on its bearing members, and means for grinding said roll, each open bearing comprising front and rear sets of arc-shaped supports, the uppermost support of the front set being located a substantial distance below the horizontal plan of the axis of the roll supported thereon so that the grinding means may contact with and grind the bearing of the roll substantially in the horizontal plane of the axis, and the uppermost support of the rear set being relatively close to the said plane to support the roll bearing against the thrust of the grinding means.

10. A grinding machine having in combination, work supporting means, work grinding means, and means for feeding said grinding means longitudinally relative to the work comprising a worm shaft, a pulley shaft, means to vary the relative speed of said shafts, driving means for said pulley, and means to vary the actual speed of said driving means through a series of steps.

11. A grinding machine having in combination, work supporting means, work grinding means, and means for feeding said grinding means longitudinally relative to the work comprising straight and cross belts, means for driving said belts at any one of a series of different speeds, a pulley arranged to be driven by either one of said belts, a shaft supporting said pulley, change gearing driven thereby, a worm shaft connected through gearing to a rack to move the grinding means, and means to connect said worm shaft to either the high or low speed part of said change gearing or to disconnect the worm shaft from the change gearing.

12. In a grinding machine, the combination of a work table, a pair of supporting heads mounted thereon, a support adjustably mounted for longitudinal movement on said work table, a driving socket carried by said support, a driving shaft extending from said support, a universal joint arranged in said support between said socket and driving shaft, and means for rotating said driving shaft.

13. In a grinding machine, the combination of a work table, a pair of supporting heads carried thereon, a support adjustably arranged thereon, a socket carried by said support, a slotted driving shaft extending from said socket, a universal joint connection between said driving shaft and said socket, a gear having a hub provided with a key through which said slotted shaft extends, and means for rotating said gear.

14. In a grinding machine, the combination of a work table, a pair of supporting heads carried thereon, a support adjustably arranged thereon, a socket carried by said support, a slotted driving shaft extending from said socket, a universal joint connection between said driving shaft and said socket, a gear having a hub provided with a key through which said slotted shaft extends, and means for rotating said gear at different speeds.

15. In a grinding machine, the combination of a work base, a work table pivoted thereto, a pair of supporting heads having adjustable supports carried by the work table, a support adjustably mounted for longitudinal movement on the work table and carrying a socket for engaging the end of a roll carried by said supporting heads, and means arranged on said work table for rotating said socket.

16. In a grinding machine, the combination of a pair of supporting heads arranged to support a roll on the peripheries of its bearings, means for rotating the roll while thus supported, a wheel base, a wheel table movably mounted on the base, and a grinding wheel carried on the wheel table, said parts being so constructed that both the bearings and the working periphery of the roll can be ground.

17. In a grinding machine, the combination of a wheel base, a wheel table movably mounted thereon, open and cross driving belts, pulleys and gearing for moving the wheel table back and forth on the wheel base, hand operating mechanism for moving the wheel table, and connections whereby the hand operating mechanism can only be operated when the open and closed belts are thrown to inoperating position.

18. In a grinding machine, the combination of a wheel base, a wheel table movably mounted thereon, means for moving the table by power in either direction, a reversing mechanism arranged so that the wheel table will reciprocate automatically, a hand operating mechanism for moving the wheel table, and connections whereby the hand operating mechanism can only be operated when the power feed is disconnected.

19. In a grinding machine, the combination of a wheel table, means for moving the same by power in either direction, means for moving the same by hand, and connections whereby the table can only be moved by hand when the power feed is disconnected.

20. In a grinding machine, the combination of a wheel table, means for moving the same by power in either direction, means for moving the same by hand, an operating handle extending through a T-shaped slot and arranged so that when the operating handle is in the vertical portion of the slot, the table can be moved by hand, and so that the operating handle can be thrown into either horizontal portion of the slot to cause the table to move by power in either direction.

21. In the controlling connections for the wheel table of a grinding machine, an operating handle, a casing having an inverted T-shaped slot through which the handle extends, and connections from said handle arranged so that when the operating handle is lifted into the vertical part of the slot, the table can be moved by hand, and so that when the handle is thrown to either side in the horizontal part of the slot, the table will be moved by power in the direction in which the handle is moved.

22. In the controlling connections for the wheel table of a grinding machine, the combination of an operating handle, a casing having an inverted T-shaped slot through which the handle extends, a horizontal slot formed in said casing, a dog carried by said operating handle engaging therewith, and connections whereby when the handle is in the vertical part of the slot the table can be moved by hand, whereby when the dog is in said horizontal slot, the handle can be moved horizontally to cause the table to be moved by power in either direction, and whereby when said dog is released from said horizontal slot, and the handle brought into the lower part of the horizontal portion of the T-slot, the handle can be moved horizontally to cause the table to be reciprocated by power.

23. In a grinding machine, the combination of a movable wheel table, means for moving the same by power, and controlling connections consisting of an apron, a controlling lever pivoted to the apron, a reversing lever pivoted to the apron, adjustable stops with which the reversing lever will engage, and a slider carrying springs and connecting said levers.

24. In a grinding machine, the combination of a movable table, means for moving the same by power, controlling connections consisting of an apron, a controlling lever pivoted to the apron, a reversing lever pivoted to the apron, adjustable stops with which the reversing lever will engage, a slider to which the controlling lever is connected, a sleeve on said rod with which the reversing lever is connected, and springs arranged between the ends of said slider and said sleeve.

25. In a grinding machine, the combination of a movable table, means for moving the same by power, controlling connections consisting of an apron, a controlling lever pivoted to the apron, a reversing lever pivoted to the apron, adjustable stops with which the reversing lever will engage, a slider to which the controlling lever is connected, a sleeve on said rod with which the reversing lever is connected, springs arranged between the ends of said slider, collars mounted on said rod, and a stop for limiting the motion of said collars, whereby said sleeve will normally be held in central position.

26. In the controlling connections for the wheel table of a grinding machine, the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, and latches for the slider set in position to be engaged by the reversing lever.

27. In the controlling connections for the wheel table of a grinding machine, the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, latches for the slider set in position to be engaged by the reversing lever, and means for holding the latches out of operation.

28. In the controlling connections for the wheel table of a grinding machine the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, latches for the slider set in position to be engaged by the reversing lever, an operating handle, a floating lever for controlling the operation of the latches, and connections between the operating handle and floating lever.

29. In the controlling connections for the wheel table of a grinding machine, the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, latches for the slider set in position to be engaged by the reversing lever, an operating handle, a floating lever for controlling the operation of the latches, connections between the operating handle and floating lever, whereby the lever may be raised and the latches be rendered inoperative, and connections between the operating handle and the slider whereby the driving mechanism may be manually controlled.

30. In the controlling connections for the wheel table of a grinding machine, the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, latches for the slider set in position to be engaged by the reversing lever, an operating handle, a floating lever for controlling the operation of the latches, and connections between the operating handle and floating lever, the operating handle being connected to said slider, and a casing having an inverted T-shaped slot through which the operating handle projects.

31. In the controlling connections for the wheel table of a grinding machine, the combination of a pivoted controlling lever connected to control the driving mechanism, a pivoted reversing lever, adjustable stops with which the pivoted reversing lever will engage, a slider engaged by the controlling lever, a rod carried by said slider, a sleeve on said rod with which the reversing lever engages, springs between said sleeve and the ends of the slider, latches for the slider set in position to be engaged by the reversing lever, an operating handle, a floating lever for controlling the operation of the latches, connections between the operating handle and floating lever, the operating handle being connected to said slider, a casing having an inverted T-shaped slot through which the operating handle projects, a dog carried by the handle, a horizontal slot in which the same engages, the parts being arranged so that when the handle is in the vertical part of the slot, the power feed will be disconnected and the wheel table can be moved by hand, so that when the dog is in said horizontal slot and the operating handle moved horizontally in either direction, the wheel table will be fed by power in the same direction as the handle is moved, and whereby when the dog is released from said slot and the operating handle dropped to its lowest position and moved horizontally, the power feed will be engaged and the reversing mechanism brought into operation so that the wheel table will be reciprocated within the limits determined by the adjustable stops.

In testimony whereof I have hereunto set my hand, in the presence of two subscribing witnesses.

CHARLES H. NORTON.

Witnesses:
Louis W. Southgate,
C. Forrest Wesson.